(12) United States Patent
Wilke et al.

(10) Patent No.: US 7,297,723 B2
(45) Date of Patent: *Nov. 20, 2007

(54) POWDER SLURRIES WHICH CAN BE HARDENED THERMALLY AND BY MEANS OF ACTINIC RADIATION, A METHOD FOR THE PRODUCTION THEREOF AND THE USE OF THE SAME

(75) Inventors: Guido Wilke, Münster (DE); Ulrike Röckrath, Senden (DE); Joachim Woltering, Münster (DE); Egon Wegner, Veitshöchheim (DE); Hubert Baumgart, Münster (DE); Günther Ott, Münster (DE)

(73) Assignee: BASF Coatings AG, Munster (DE)

( * ) Notice: Subject to any disclaimer, the term of this patent is extended or adjusted under 35 U.S.C. 154(b) by 623 days.

This patent is subject to a terminal disclaimer.

(21) Appl. No.: 10/468,885

(22) PCT Filed: Mar. 28, 2002

(86) PCT No.: PCT/EP02/03511

§ 371 (c)(1),
(2), (4) Date: Aug. 21, 2003

(87) PCT Pub. No.: WO02/079290

PCT Pub. Date: Oct. 10, 2002

(65) Prior Publication Data

US 2004/0048977 A1 Mar. 11, 2004

(30) Foreign Application Priority Data

Mar. 29, 2001 (DE) ................................ 101 15 605

(51) Int. Cl.
C08F 2/46 (2006.01)
B05D 7/00 (2006.01)
(52) U.S. Cl. .................. 522/6; 528/367; 427/407.1
(58) Field of Classification Search ............. 427/407.1; 522/6; 528/367
See application file for complete search history.

(56) References Cited

U.S. PATENT DOCUMENTS

| 4,128,600 | A | 12/1978 | Skinner et al. |
| 5,546,768 | A | 8/1996 | Kuhrau et al. |
| 6,013,326 | A | 1/2000 | Flosbach et al. |
| 6,296,903 | B1 | 10/2001 | Sapper et al. |
| 6,332,291 | B1 | 12/2001 | Flosbach et al. |
| 6,333,077 | B1 | 12/2001 | Maag et al. |
| 6,555,597 | B1 | 4/2003 | Weikard et al. |
| 7,022,748 | B2 * | 4/2006 | Wilke et al. .................. 522/95 |
| 7,122,289 | B2 * | 10/2006 | Wilke et al. ............. 430/270.1 |
| 2004/0048977 | A1 * | 3/2004 | Wilke et al. ................ 524/589 |

FOREIGN PATENT DOCUMENTS

| CA | 2386222 | 9/2000 |
| DE | 2258813 | 1/1999 |
| DE | 19841842 | 3/2000 |
| DE | 19855146 | 5/2000 |
| DE | 19908018 | 8/2000 |
| DE | 19920799 | 11/2000 |
| DE | 19920801 | 11/2000 |
| DE | 199 04 317 | 8/2002 |
| DE | 199 08 013 | 8/2002 |
| WO | WO02/079333 | 10/2002 |
| WO | WO02/079334 | 10/2002 |

OTHER PUBLICATIONS

U.S. Appl. No. 09/786,956.
U.S. Appl. No. 09/856,949.
U.S. Appl. No. 09/889,647.
U.s. Appl. No. 09/890,520.
U.S. Appl. No. 09/889,918.
U.S. Appl. No. 10/018,106.
U.S. Appl. No. 10/009,394.
English Language Translation of WO02/079333.
English Language Translation of WO02/079334.
English Language Abstract of JP04293915, Derwent Accession No. 1992-394602, Oct. 19, 1992.

* cited by examiner

Primary Examiner—William Phillip Fletcher, III

(57) ABSTRACT

Powder slurries curable thermally and with actinic radiation and comprising solid and/or highly viscous particles dimensionally stable under storage and application conditions, comprising (A) a binder free of carbon-carbon double bonds activatable with actinic radiation, comprising at least one (meth)acrylate copolymer containing on average per molecule at least one isocyanate-reactive functional group and at least one ion-forming group, (B) at least one blocked and/or part-blocked polyisocyanate, and (C) at least one olefinically unsaturated constituent which is free of isocyanate-reactive functional groups and contains on average per molecule more than four carbon-carbon double bonds activatable with actinic radiation;

processes for preparing them, and their use.

20 Claims, No Drawings

POWDER SLURRIES WHICH CAN BE HARDENED THERMALLY AND BY MEANS OF ACTINIC RADIATION, A METHOD FOR THE PRODUCTION THEREOF AND THE USE OF THE SAME

CROSS REFERENCE TO RELATED APPLICATIONS

This application is a National Phase Application of Patent Application PCT/EP02/03511 filed on 28 Mar. 2002, which claims priority to DE 101 15 605.7, filed on 29 March 2001.

The present invention relates to novel powder slurries curable thermally and with actinic radiation. The present invention also relates to a novel process for preparing powder slurries curable thermally and with actinic radiation.

Furthermore, the present invention relates, to the use of the novel powder slurries curable thermally and with actinic radiation as coating materials, adhesives and sealing compounds.

The present invention relates in particular to the use of the novel powder slurries curable thermally and with actinic radiation as clearcoat materials and as color and/or effect coating materials for producing clearcoats, single-coat, or multicoat color and/or effect coating systems, and combination effect coats in the fields of automotive OEM finishing, automotive refinish, industrial coating, including coil coating, container coating, and coating or impregnation of electrical components, and in the coating of furniture, windows, doors, and buildings inside and out.

Actinic radiation here and below means electromagnetic radiation such as near infrared, visible light, UV radiation or X-rays, especially UV radiation, and corpuscular radiation such as electron beams.

Combined curing by heat and actinic radiation is referred to by those in the art as dual cure. Accordingly, here and below, the novel powder slurries, coating materials, adhesives and sealing compounds in question are referred to as dual-cure powder slurries, coating materials, adhesives and sealing compounds.

Here and below, a combination effect coat is a coat which in a color and/or effect coating system fulfills at least two functions. Functions of this kind are, in particular, protection against corrosion, promotion of adhesion, absorption of mechanical energy, and imparting of color and/or effect. In particular, the combination effect coat serves to absorb mechanical energy and to impart color and/or effect at the same time it therefore fulfills the functions of a primer-surfacer coat or antistonechip primer coat and of a basecoat. Preferably, furthermore, the combination effect coat has a corrosion protection effect and/or adhesion promotion effect (cf. Römpp Lexikon Lacke und Druckfarben, Georg Thieme Verlag, Stuttgart, N.Y., 1998, pages 49 and 51, "Automotive finishes")

Dual-cure coating materials are known from the German patent application DE 198 18 735 A1. The dual-cure mixtures necessarily include constituents, such as (meth)acrylate copolymers, which besides isocyanate-reactive functional groups mandatorily contain (meth)acryloyl groups, and constituents, such as (meth)acrylate copolymers, for example, which besides complementary free isocyanate groups likewise mandatorily contain (meth)acryloyl groups. Furthermore, they may comprise (meth)acrylate copolymers which are free from (meth)acryloyl groups but contain isocyanate-reactive groups. Over and above this, the German patent application describes a host of alternatives to these components, which are all said to be of equal effect. For example, instead of the (meth)acrylate copolymers which besides isocyanate-reactive functional groups mandatorily contain (meth)acryloyl groups it is possible to use the analogous urethane (meth)acrylates. Moreover, the glass transition temperatures, Tg, which the (meth)acryloyl-free (meth)acrylate copolymers are to have are not stated.

The known dual-cure coating materials may be on an aqueous or solventborne basis. In the case of aqueous dual-cure coating materials, measures must be taken to ensure the dilutability of the binders in water. To achieve sufficient water dilutability it is preferred to use emulsifiers, with particular preference nonionic emulsifiers. Dual-cure powder slurries, however, are not described.

It is indeed stated that the known dual-cure coating materials give coatings having very good chemical, gasoline and solvent resistance, high scratch resistance, and good and rapid sandability, and are said in this respect to satisfy the requirements imposed on a multicoat system in the field of automotive finishing, especially automotive refinish. Furthermore, the coatings are said to be free from cracks and to exhibit good adhesion to the substrate. Overall, they are said to show a flawless visual appearance. But as to how this profile of properties can be optimized and adjusted in detail, and as to which of the virtually innumerable alternatives, which may be inferred from a plurality of lists, are the ones which function best, neither the description nor any example gives specifics.

The international patent application WO 98/40170 discloses a dual-cure clearcoat material for a wet-on-wet technique in which a film of a basecoat material is overcoated with a clearcoat material and then the resulting clearcoat film is exposed to actinic radiation before the two films are baked together. The clearcoat material contains, based on its solids content, from 50 to 98% by weight of a system A) which is curable thermally by addition and/or condensation reactions, and is substantially free from free-radically polymerizable double bonds and substantially free from groups reactive in other ways with free-radically polymerizable double bonds of the system B), and from 2 to 50% by weight of a system B) which can be cured by free-radical polymerization of olefinic double bonds on exposure to actinic radiation.

The system A) preferably comprises a hydroxy-functional acrylic binder whose glass transition temperature, however, is not specified. Accordingly, the skilled worker is unable to derive anything from the international patent application regarding the significance of this parameter for the adjustment of the scratch resistance and other important performance properties, such as the chemical resistance, of clearcoats, especially in the shadow zones of three-dimensional substrates of complex shape.

The system B) which can be cured by free-radical polymerization of olefinic double bonds may comprise a hexafunctional aliphatic urethane acrylate with a theoretical molar weight of 1000.

Crosslinking agents which may be used for the system A) include blocked cycloaliphatic or aliphatic diisocyanates, such as hexamethylene diisocyanate and isophorone diisocyanate, and also polyisocyanates based thereon. The control of the glass transition temperature, Tg, of the clearcoats via the use of soft, flexibilizing segments, however, is not mentioned, and no distinction is made in this respect between the blocked polyisocyanates indicated.

The known dual-cure clearcoat materials may be in the form of aqueous emulsions. In such emulsions, the emulsified state may be achieved through the addition of external emulsifiers, or the systems A) and/or B) comprise systems which contain groups which have a self-emulsifying effect in water, examples being ionic groups. However, the systems in question are not powder slurries but, rather, are disperse systems, in which one liquid phase is distributed in another liquid phase with which it is immiscible (cf. Röpp Lexikon Lacke und Druckfarben, Georg Thieme Verlag, Stuttgart, N.Y., 1998, page 190, "Emulsions").

The known dual-cure clearcoat materials are said to give clearcoats having an outstanding visual/esthetic appearance. In the course of their production, there is said not to be any running on vertical surfaces. The clearcoats are said to possess reduced susceptibility to chemicals and scratching, especially with respect to acid and wash scratches.

The German patent application DE 199 08 013 A1 discloses a pseudoplastic dual-cure powder clearcoat slurry which comprises solid spherical particles with an average size of from 0.8 to 20 µm and a maximum size of 30 µm, the dual-cure powder clearcoat slurry containing from 0.05 to 1 meq/g of ion-forming groups, containing from 0.05 to 1 meq/g of neutralizing agents, and having a viscosity of (i) from 50 to 1000 mPas at a shear rate of $1000\ s^{-1}$, (ii) from 150 to 8000 mPas at a shear rate of $10\ s^{-1}$, and (iii) from 180 to 12,000 mPas at a shear rate of $1\ s^{-1}$.

The known dual-cure powder clearcoat slurry may optionally comprise polyacrylate constituents as thermally curable binders. There are no details on the glass transition temperature, Tg, which the polyacrylates are to have.

As crosslinking agents for the thermal curing it is possible to use blocked polyisocyanates. The control of the glass transition temperature, Tg, of the clearcoats via the use of soft, flexibilizing segments, however, is not mentioned, nor is any distinction made in this respect between the blocked polyisocyanates indicated.

As binders that are curable with actinic radiation it is possible, inter alia, to use urethane acrylates. No data are given on the acrylate functionality. Moreover, the control of the glass transition temperature, Tg, of the clearcoats, through the use of hardening segments in the urethane acrylates is again not mentioned. The preferred binders, however, are acrylic resins containing carbon-carbon double bonds.

The known dual-cure powder clearcoat slurry is easy to prepare and has reliable application properties in respect of popping marks at the required film thicknesses of 40-50 µm, even without the aid of organic solvents. The clearcoats produced from it have outstanding performance properties. Accordingly, they adhere firmly to all customary and known basecoat films or primed or unprimed substrates. They are of high gloss, scratch resistant, smooth, stable to weathering, and free from defects.

The German patent application DE 199 08 018 A1 likewise discloses a dual-cure powder clearcoat slurry which comprises constituents containing functional groups (A) which render it curable with actinic radiation and constituents containing complementary functional groups (B), especially epoxide groups, which render it thermally curable, in a weight ratio of from 50:1 to 1:50.

The thermally curable binders which may be used include polyacrylates, especially those containing epoxide groups.

As binders curable with actinic radiation it is possible, inter alia, to use urethane acrylates. Nothing, however, is said about their functionality and structure. Moreover, the known dual-cure powder clearcoat slurry comprises crosslinking agents, especially one containing carboxyl groups. Blocked polyisocyanates may also be used. The control of the glass transition temperature, Tg, of the clearcoats through the use of soft, flexibilizing segments, however, is not mentioned, nor is any distinction made in this respect between the stated blocked polyisocyanates.

Furthermore, the known dual-cure powder clearcoat slurry may comprise oligomeric and polymeric, thermally curable reactive diluents as optional constituents. Those suitable include polyacrylates having a glass transition temperature, Tg, of from −35 to +85° C., and an acid number of from 0 to 35 mg KOH/g and a hydroxyl number of from 40 to 240 mg KOH/g.

This known dual-cure powder clearcoat slurry also has reliable application properties in respect of popping marks at film thicknesses of 30-50 µm. The clearcoats have outstanding performance properties. Accordingly, they adhere firmly to all customary and known basecoat films or primed or unprimed substrates. They are of high gloss, smooth, scratch resistant, stable to weathering, and free from defects.

The German patent application DE 199 20 799 A1 discloses a dual-cure coating material mandatorily containing (a1) at least one constituent containing
  (a11) at least two functional groups which serve for crosslinking with actinic radiation, and if desired
  (a12) at least one functional group which is able to undergo thermal crosslinking reactions with a complementary functional group (a22) in the constituent (a2), and (a2) at least one constituent containing
  (a21) at least two functional groups which serve for crosslinking with actinic radiation, and
  (a22) at least one functional group which is able to undergo thermal crosslinking reactions with a complementary functional group (a12) in the constituent (a1), and if desired (a3) at least one photoinitiator,
(a4) at least one thermal crosslinking initiator,
(a5) at least one reactive diluent curable thermally and/or with actinic radiation,
(a6) at least one coatings additive and/or
(a7) at least one thermally curable constituent;

with the proviso that the coating material comprises at least one thermally curable constituent (a7) if the constituent (a1) contains no functional group (a12).

The dual-cure coating material may be used as a clearcoat material and, given an appropriate choice of its constituents, may also be a dual-cure powder slurry.

As constituent (a1) it is possible, inter alia, to use a urethane (meth)acrylate. It is also possible, however, to use hydroxyl-containing urethane (meth) acrylates (a1). The (meth) acrylate functionality of constituent (a1) is at least 2. No further details are given.

The mandatory constituent (a2) comprises in particular an isocyanato acrylate having free isocyanate groups, as is described, for example, in the European patent application EP 0 928 800 A1.

Furthermore, the dual-cure mixture may also comprise thermally curable (meth)acrylate copolymers (a7), for which, however, numerous alternatives are stated. Moreover, the thermally curable (meth)acrylate copolymers (a7) are not characterized in any more detail in respect of their composition, their glass transition temperature Tg or the amount of reactive functional groups for thermal crosslinking they contain.

Furthermore, the dual-cure coating material may comprise, inter alia, blocked polyisocyanates as constituent (a7). There is no reference to the fact that, from the many proposed blocked polyisocyanates, those to be selected are polyisocyanates which contain at least one soft, flexibilizing segment as a molecule building block.

The clearcoats produced with the aid of the known dual-cure clearcoat materials exhibit good scratch resistance, intercoat adhesion, weathering stability and chemical stability, and also an outstanding profile of optical properties.

A comparable dual-cure coating material is known from the German patent application DE 199 20 801 A1. As far as the thermally curable (meth)acrylate copolymers are concerned, all that is stated is that their amount should in general not exceed 40% by weight, based on the coating material. The known dual-cure coating material is used to produce multicoat clearcoat systems which are highly scratch resistant, weathering stable, yellowing free, hard, flexible, and free from surface defects, on all substrates, and which have a high level of adhesion within the clearcoat systems and can be produced in the high film thickness necessary for an outstanding overall appearance. To this end, a film of the dual-cure coating material is overcoated with a further film of the dual-cure coating material that contains nanoparticles, after which the two films are cured together. However, this process is comparatively complex.

The dual-cure powder slurries known to date, and the coatings produced from them, thus have an entirely advantageous profile of properties, which should be retained.

In a continuous coating process, however, such as, for example, in continuous operation in the paint shop of a motor vehicle plant, the dual-cure powder slurries exhibit certain weaknesses. In these paint shops, the applied dual-cure powder slurry films on the bodies are first of all dried and thermally cured at relatively high temperatures, immediately following which—ideally without substantial cooling—they are cured using UV radiation.

Since the bodies represent three-dimensional substrates of complex shape, they have numerous shadow zones, such as cavities, folds, and other structural undercuts or edges. Optimum, in particular complete, exposure of the shadow zones to UV radiation is, however, highly complex in terms of apparatus and control technology, and is also time-consuming, since it has to be done using—additionally—pointwise, small-area and all-round emitters in conjunction with automatic movement means.

Unless optimum exposure is achieved, however, it has to date been necessary to accept that the resulting coatings or finishes will have an unsatisfactory profile of performance properties in the shadow zones. In particular, they do not attain the scratch resistance and chemical resistance of the fully cured coatings or finishes outside the shadow zones. This may cause problems not only during the subsequent use of the motor vehicles but indeed also in the course of the further painting process in the paint shop and during the further manufacturing process: for example, when installing seats, doors, windows, electrical components, and motors into the painted bodies. The finishes may easily be damaged by mechanical and chemical exposure.

The problems depicted above also occur with the dual-cure sealing compounds and adhesives of the prior art and with the seals and adhesive films produced from them.

It is an object of the present invention to provide novel dual-cure powder slurries which are easy to prepare and have outstanding application properties. The novel dual-cure powder slurries should provide coatings, adhesive films and seals, especially coatings, such as clearcoats, single-coat or multicoat color and/or effect coating systems, and combination effect coats, which match, if not indeed exceed, the profile of performance properties of the prior art coatings, adhesive films and seals. On and in three-dimensional substrates of complex shape, they should exhibit a good profile of performance properties, especially as regards scratch resistance and chemical resistance, in particular in continuous operation, and even where exposure of the shadow zones to actinic radiation is less than ideal, in particular incomplete, so that the apparatus and measurement and control technology involved in curing with actinic radiation may be simplified and the process time shortened.

The invention accordingly provides the novel powder slurries curable thermally and with actinic radiation and comprising highly viscous and/or solid particles dimensionally stable under storage and application conditions, comprising (A) a binder free of carbon-carbon double bonds activatable with actinic radiation, comprising at least one (meth)acrylate copolymer containing on average per molecule at least one isocyanate-reactive functional group and at least one ion-forming group, (B) at least one blocked and/or part-blocked polyisocyanate, and (C) at least one olefinically unsaturated constituent which is free of isocyanate-reactive functional groups and contains on average per molecule more than four carbon-carbon double bonds activatable with actinic radiation.

In the light of the prior art it is surprising, and was not foreseeable for the skilled worker, that the object on which the invention is based might be achieved by means of the novel dual-cure powder slurries.

A particular surprise was that the novel dual-cure powder slurries gave coatings, adhesive films and seals, especially coatings, such as clearcoats, single-coat or multicoat, color and/or effect coating systems, and combination effect coats which matched, if not indeed exceeded, the profile of performance properties of the prior art coatings, adhesive films and seals.

Even more of a surprise was that on and in three-dimensional substrates of complex shape, and especially in continuous operation and even with less than optimum, in particular incomplete, exposure of the shadow zones to actinic radiation, they gave coatings, adhesive films and seals which had a good profile of performance properties, especially as regards scratch resistance and chemical resistance, so that the apparatus and measurement and control technology involved in curing with actinic radiation could be simplified and the process time shortened.

Another particular surprise was the broad applicability of the novel dual-cure powder slurries in a very wide variety of fields of use.

The novel dual-cure powder slurries comprise particles which are solid and/or highly viscous and dimensionally stable under storage and application conditions.

In the context of the present invention, "highly viscous" means that, under the customary and known conditions of storage and application of powder slurries, the particles behave substantially like solid particles.

The particles are also dimensionally stable. In the context of the present invention, "dimensionally stable" means that, under the customary and known conditions of storage and application of aqueous dispersions or powder slurries, the particles neither agglomerate nor break down into smaller particles but instead substantially retain their original form, even on exposure to shear forces.

Preferably, the novel dual-cure powder slurries are free of organic solvents. In the context of the present invention this means that they have a residual volatile solvent content of <10% by weight, preferably <5% by weight, and with particular preference <1% by weight.

In accordance with the invention it is of very particular advantage if the residual content lies below the gas-chromatographic detection limit.

The average particle size of the solid particles is preferably from 0.8 to 20 μm and with particular preference from 3 to 15 μm. By average particle size is meant the 50% median value determined in accordance with the laser diffraction method, i.e., 50% of the particles have a particle diameter≦the median and 50% of the particles have a particle diameter≧the median.

The novel dual-cure powder slurries comprising particles having such average particle sizes exhibit better application properties and, at the applied film thicknesses of >30 μm as currently practiced in the automotive industry for the final finishing of automobiles, show little if any tendency toward popping and mud cracking.

The particle size reaches its upper limit when the particles are unable, owing to their size, to flow out fully on baking, with the consequence of adverse effects on film leveling. Where appearance requirements are not so critical, the particle size may, however, also be higher 30 μm is considered a rational upper limit, since above this particle size it becomes more likely that the spray nozzles and conveying units of the highly sensitive application equipment will become clogged.

Preferably, the preferred particle sizes described above are obtained, even without the aid of additional external emulsifiers, if the particles overall contain an amount of ion-forming groups that corresponds to an average acid number or amine number of from 3 to 56 g KOH/g solids (MEQ acid or amine of from 0.05 to 1.0 meq/g solids), preferably up to 28 (MEQ acid or amine: 0.5) and in particular up to 17 (MEQ acid or amine: 0.3).

It is of advantage if the ion-forming groups are present exclusively or predominantly, i.e. to an extent of more than 50, especially more than 70 mol %, in the below-described binders (A).

It is preferred to aim for a low amount of such groups, generally speaking since free groups of this kind remain in the cured coating and may lessen its resistance to environmental substances and chemicals. On the other hand, the amount of such groups must still be high enough to ensure the desired stabilization.

Using neutralizing agents, the ion-forming groups are neutralized 100% or else partially neutralized (<100% neutralized). The amount of neutralizing agent is chosen such that the MEQ value of the novel dual-cure powder slurry is situated below 1, preferably below 0.5 and in particular below 0.3 meq/g solids. It is of advantage if the amount of neutralizing agent corresponds at least to an MEQ value of 0.05 meq/g solids.

Suitable anion-forming groups include acid groups such as carboxylic acid, sulfonic acid or phosphonic acid groups. Accordingly, neutralizing agents used include bases, such as alkali metal hydroxides, ammonia or amines. Alkali metal hydroxides can be used only to a limited extent, since the alkali metal ions are not volatile on baking and, owing to their incompatibility with organic substances, may cloud the film and lead to loss of gloss. Consequently, ammonia or amines are preferred. In the case of amines, water-soluble tertiary amines are preferred. By way of example, mention may be made of N,N-dimethylethanolamine or aminomethylpropanolamine (AMP).

Suitable cation-forming groups include primary, secondary or tertiary amines. Accordingly, neutralizing agents used include, in particular, low molecular mass organic acids such as formic acid, acetic acid or lactic acid.

For the preferred use of the novel dual-cure powder slurries as dual-cure coating materials, adhesives or sealing compounds, acid groups are preferred as ion-forming groups, since the coatings, adhesive films or seals produced therefrom generally have better resistance to yellowing than the coatings, adhesive films and seals produced from the novel dual-cure powder slurries based on particles containing cationic groups.

Nevertheless, cationic particles containing groups convertible into cations, such as amino groups, are likewise suitable for use in principle, provided the field of use tolerates their typical secondary properties such as their tendency to yellow.

The first key constituent of the novel dual-cure powder slurries is a binder (A) which is free of carbon-carbon double bonds activatable with actinic radiation. In the context of the present invention, "free of carbon-carbon double bonds" means that the binders (A) in question contain no, or only technically occasioned traces of such double bonds.

The binder (A) contains at least one, preferably at least two, (meth) acrylate copolymer(s) (A) containing on average per molecule at least one, preferably at least two, with particular preference at least three, and in particular at least four isocyanate-reactive functional groups and at least one, preferably at least two, and in particular at least three ion-forming groups.

Examples of suitable isocyanate-reactive functional groups are thiol, hydroxyl and primary and secondary amino groups, especially hydroxyl groups.

Examples of suitable ion-forming groups are those described above.

The (meth)acrylate copolymer (A) or the mixture of at least two (meth)acrylate copolymers (A) preferably has a glass transition temperature Tg of from −40 to +80° C.

Where only one (meth)acrylate copolymer (A) is used, it may have a low or a high glass transition temperature Tg within the stated temperature range. The (meth)acrylate copolymer (A) preferably has a low glass transition temperature Tg, preferably below room temperature, in particular below 0° C.

In one preferred embodiment the binder (A) comprises at least one, especially one, (meth)acrylate copolymer (A1) and at least one, especially one, (meth)acrylate copolymer (A2), or the binder consists of these (meth) acrylate copolymers (A1) and (A2)

The (meth)acrylate copolymer (A1) contains on average per molecule at least one, preferably at least two, with particular preference at least three, and in particular at least four isocyanate-reactive functional groups and has a glass transition temperature Tg below room temperature, preferably below 0, more preferably below −5, with particular preference below −10, with very particular preference below −15, and in particular below −20° C.

The (meth)acrylate copolymer (A2) contains on average per molecule at least one, preferably at least two, with particular preference at least three, and in particular at least four isocyanate-reactive functional groups and has a glass transition temperature Tg above room temperature, preferably above 30, more preferably above 32, very preferably above 35, with particular preference above 40, with very particular preference above 42, and in particular above 45° C.

Examples of suitable isocyanate-reactive groups for use in the (meth)acrylate copolymers (A1) and (A2) are those described above. The (meth)acrylate copolymers (A1) and (A2) may contain different or identical isocyanate-reactive groups, or combinations of isocyanate-reactive groups, with the number of isocyanate-reactive groups in the (meth) acrylate copolymers (A1), on the one hand, and in the (meth)acrylate copolymers (A2), on the other hand, being identical or different. For example, the (meth)acrylate copolymers (A1) may contain hydroxyl groups and the (meth)acrylate copolymers (A2) may contain secondary and/or primary amino groups. Numerous further permutations are conceivable here, and are easy for the skilled worker to infer, so that there is no need to go into this in detail here.

Preferably, hydroxyl groups are used.

The hydroxyl content of the (meth)acrylate copolymers (A1) and (A2) may vary widely. The lower limit is a result of the proviso that there must be at least one hydroxyl group in the (meth)acrylate copolymers (A1) and (A2). The hydroxyl number is preferably from 50 to 300, more preferably from 80 to 250, very preferably from 100 to 220, with particular preference from 120 to 200, with very particular preference from 140 to 190, and in particular from 150 to 185 mg KOH/g.

The (meth)acrylate copolymers (A1) and (A2) preferably have an acid number of from 3 to 70, more preferably from 3 to 65, with particular preference from 5 to 60, with very particular preference from 7 to 55, in particular from 10 to 50, and especially from 12 to 45 mg KOH/g. It is possible for one of the (meth)acrylate copolymers, (A1) or (A2), to have an acid number of 0 or near to 0 mg KOH/g, while the other (meth)acrylate copolymer, (A2) or (A1), has an acid number>0 mg KOH/g, provided the (meth)acrylate copolymer (A) free of acid groups is dispersed along with the one containing acid groups. Preferably, the (meth)acrylate copolymers (A1) and (A2) have the same, or approximately the same, acid number.

The weight ratio of (meth)acrylate copolymer (A1) to (meth)acrylate copolymer (A2) may vary widely from one binder (A) to another. Preferably, the weight ratio of (A1) to (A2) is from 1:10 to 10:1, more preferably from 1:8 to 8:1, with particular preference from 1:6 to 6:1, with very particular preference from 1:4 to 4:1, and in particular from 1:2 to 2:1.

It is a particular advantage of the novel dual-cure powder slurries that the above-described (meth)acrylate copolymers (A1) and (A2) may also be used individually as binders (A) without any risk of this lessening the advantageous technical effect aimed at in accordance with the invention. Indeed, it is a further, very particular advantage of the novel dual-cure powder slurries that any, possibly unwanted change in the profile of properties which may be induced by the choice of the binder (A) can easily be compensated, or even overcompensated, by appropriate selection of the blocked and/or part-blocked polyisocyanates (B) described below and/or of the olefinically unsaturated constituents (C) described below.

The above-described (meth)acrylate copolymers (A), including the (meth)acrylate copolymers (A1) and (A2), are prepared by free-radical copolymerization of at least two, preferably at least three and in particular at least four different olefinically unsaturated monomers (a).

One of the monomers (a) is an olefinically unsaturated monomer (a1) by means of which the isocyanate-reactive functional groups are introduced into the (meth)acrylate copolymers (A). At least one of the other monomers (a) substantially comprises olefinically unsaturated monomers (a2) containing no isocyanate-reactive functional groups. These monomers (a2) may be free of reactive functional groups or may contain reactive functional groups which are able to undergo thermal crosslinking reactions with other, complementary reactive functional groups, with the exception of isocyanate groups.

Examples of suitable olefinically unsaturated monomers (a1) are hydroxyalkyl esters of alpha,beta-olefinically unsaturated carboxylic acids, such as hydroxyalkyl esters of acrylic acid, methacrylic acid and ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1,4-bis(hydroxymethyl)cyclohexane, octahydro-4,7-methano-1H-idenedimethanol or methylpropanediol monoacrylate, monomethacrylate, monoethacrylate or monocrotonate; or reaction products of cyclic esters, such as epsilon-caprolactone, and these hydroxyalkyl esters;

olefinically unsaturated alcohols such as allyl alcohol;

allyl ethers of polyols, such as trimethylolpropane monoallyl ether or pentaerythritol monoallyl, diallyl or triallyl ether. The monomers (a1) of higher functionality are generally used only in minor amounts. In the context of the present invention, minor amounts of higher-functional monomers here means those amounts which do not lead to crosslinking or gelling of the (meth)acrylate copolymers (A1) and/or (A2), unless the (meth)acrylate copolymers (A1) and/or (A2) are intended to be in the form of crosslinked microgel particles;

reaction products of alpha,beta-olefinically unsaturated carboxylic acids with glycidyl esters of an alpha-branched monocarboxylic acid having from 5 to 18 carbon atoms in the molecule. The reaction of acrylic or methacrylic acid with the glycidyl ester of a carboxylic acid having a tertiary alpha carbon atom may take place before, during or after the polymerization reaction. Preference is given to using, as monomer (a1), the reaction product of acrylic and/or methacrylic acid with the glycidyl ester of Versatic® acid. This glycidyl ester is available commercially under the name Cardura® E10. For further details, attention is drawn to Römpp Lexikon Lacke und Druckfarben, Georg Thieme Verlag, Stuttgart, N.Y., 1998, pages 605 and 606;

allylamine and crotylamine;

aminoalkyl esters of alpha,beta-olefinically-unsaturated carboxylic acids, such as aminoethyl acrylate, aminoethyl methacrylate or N-methylaminoethyl acrylate;

formaldehyde adducts of aminoalkyl esters of alpha,beta-olefinically unsaturated carboxylic acids and of alpha,beta-unsaturated carboxamides, such as N-methylol- and N,N-dimethylol-aminoethyl acrylate, aminoethyl methacrylate, acrylamide and methacrylamide; and also olefinically unsaturated monomers containing acryloxysilane groups and hydroxyl groups, preparable by reacting hydroxy-functional silanes with epichlorohydrin and then reacting the intermediate with an alpha,beta-olefinically unsaturated carboxylic acid, especially acrylic acid and methacrylic acid, or hydroxyalkyl esters thereof.

Of these monomers (a1), the hydroxyalkyl esters, especially the 2-hydroxyethyl, 2-hydroxypropyl, 3-hydroxypropyl, 3-hydroxybutyl, 4-hydroxybutyl esters of acrylicacid and methacrylic acid are of advantage and are therefore-used with particular preference.

Examples of suitable olefinically unsaturated monomers (a2) are alpha,beta-olefinically unsaturated carboxylic acids, such as acrylic acid, methacrylic acid, ethacrylic acid, crotonic acid, maleic acid, fumaric acid, itaconic acid, mono(meth) acryl-oyloxyethyl maleate, mono(meth)acryloyloxyethyl succinate and mono(meth)acryloyloxyethyl phthalate, and also vinylbenzoic acid (all isomers) and alpha-methylvinylbenzoic acid (all isomers), especially acrylic acid and/or methacrylic acid;

alkyl and cycloalkyl esters of alpha,beta-olefinically unsaturated carboxylic acids, phosphonic acids and sulfonic acids, such as (meth)acrylic, crotonic, ethacrylic, vinylphosphonic or vinylsulfonic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate, methacrylate, crotonate, ethacrylate or vinylphosphonate or vinylsulfonate; cycloaliphatic (meth)acrylic, crotonic, ethacrylic, vinylphosphonic or vinylsulfonic esters, especially cyclohexyl, isobornyl, dicyclopentadienyl, octahydro-4,7-methano-1H-indenemethanol or tert-butylcyclohexyl (meth)acrylate, crotonate, ethacrylate, vinylphosphonate or vinylsulfonate. These may contain, in minor amounts, higher-functional (meth)acrylic, crotonic or ethacrylic, alkyl or cycloalkyl esters such as ethylene glycol, propylene glycol, diethylene, glycol, dipropylene glycol, butylene glycol, pentane-1,5-diol, hexane-1,6-diol, octahydro-4,7-methano-1H-indene-dimethanol or cyclohexane-1,2-, -1,3- or -1,4-diol di(meth)acrylate; trimethylolpropane tri(meth)acrylate; or pentaerythritol tetra(meth)acrylate and also the analogous ethacrylates or crotonates. In the context of the present invention, minor amounts of higher-functional monomers (a2) means amounts which do not lead to crosslinking or gelling of the (meth)acrylate copolymers (A), unless the (meth)-acrylate copolymers (A) are to be in the form of crosslinked microgel particles;

allyl ethers of alcohols, such as allyl ethyl ether, allyl propyl ether or allyl n-butyl-ether, or of polyols, such as ethylene glycol diallyl ether, trimethylolpropane triallyl ether or pentaerythritol tetraallyl ether. Regarding the higher-functional allyl ethers (a2), the comments made above apply analogously;

olefins such as ethylene, propylene, but-1-ene, pent-1-ene, hex-1-ene, cyclohexene, cyclopentene, norbornene, butadiene, isoprene, cyclopentadiene and/or dicyclopentadiene;

amides of alpha,beta-olefinically unsaturated carboxylic acids, such as (meth)acrylamide, N-methyl-, N,N-dimethyl-, N-ethyl-, N,N-diethyl-, N-propyl-, N,N,-dipropyl-, N-butyl-, N,N-dibutyl- and/or N,N-cyclohexyl-methyl-(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methyl-styrene and vinyltoluene, and diphenylethylene or stilbene;

nitrites, such as acrylonitrile and/or methacrylonitrile;

vinyl compounds such as vinyl chloride, vinyl fluoride, vinylidene dichlbride, vinylidene difluoride; N-vinylpyrrolidone; vinyl ethers such as ethyl vinyl ether, n-propyl vinyl ether isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are sold under the brand name VeoVa® by Deutsche Shell Chemie (for further details, attention is drawn to Römpp Lexikon Lacke und Druckfarben, Georg Thieme Verlag, Stuttgart, N.Y., 1998, page 598 and also pages 605 and 606) and/or the vinyl ester of 2-methyl-2-ethylheptanic acid; and polysiloxane macromonomers which have a number average molecular weight Mn of from 1000 to 40,000, preferably from 2000 to 20,000, with particular preference-from 2500 to 10,000, and in particular from 3000 to 7000, and contain on average from 0.5 to 2.5, preferably from 0.5 to 1.5, ethylenically unsaturated double bonds per molecule, as described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international patent application WO 92/22615 on page 12 line 18 to page 18 line 10.

It is generally the case that the monomers (a1) and (a2) are selected so that the profile of properties of the (meth)acrylate copolymers (A) is determined essentially by the above-described (meth)acrylate monomers (a1) and (a2), with the monomers (a1) and/or (a2) originating from other monomer classes varying this profile of properties in an advantageously broad and targeted manner. The monomers (a) are selected so as to give the above-described glass transition temperatures Tg and also the hydroxyl numbers and acid numbers.

The skilled worker may select the monomers (a) with the aid of the following formula of Fox, by means of which the glass transition temperatures of polyacrylate resins may be calculated approximately:

$$1/Tg = \sum_{n=1}^{n=x} W_n/Tg_n; \quad \sum_n W_n = 1$$

Tg=glass transition temperature of the (meth)acrylate copolymer $W_n$ =weight fraction of the nth monomer $Tg_n$=glass transition temperature of the homopolymer of the nth monomer x=number of different monomers Viewed in terms of its method, the copolymerization has no special features, but instead takes place with the aid of the methods and apparatus as commonly employed for free-radical copolymerization in solution or in bulk in the presence of a free-radical initiator.

Examples of free-radical initiators which may be used are as follows: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, examples being azo dinitriles such as azobisisobutyronitrile; C-C-cleaving initiators such as benzpinacol silyl ethers; or a combination of a nonoxidizing initiator with hydrogen peroxide. It is also possible to use combinations of the above-described initiators. Further examples of suitable initiators are described in the German patent application DE 196 28 142 A1 on page 3 line 49 to page 4 line 6.

In the organic solutions or in bulk, the monomers (a) are then copolymerized with the aid of the aforementioned free-radical initiators at reaction temperatures which preferably lie below the lowest decomposition temperature of the respective monomers (a) employed.

Examples of organic solvents are described in "Paints, Coatings and Solvents", Dieter Stoye and Werner Freitag (editors), Wiley-VCH, 2nd edition, 1998, pages 327 to 349.

It is preferred to commence the addition of initiator a certain time, generally from about 1 to 15 minutes, before adding the monomers. Preference is further given to a process in which the addition of initiator is commenced at the same point in time as the addition of the monomers and ended about half an hour after the addition of the monomers has ended. The initiator is preferably added in a constant amount per unit time. Following the end of the addition of initiator, the reaction mixture is held at polymerization temperature until (generally from 1 to 6 hours) all of the monomers (a) employed have undergone substantially complete reaction. "Substantially complete reaction" is intended to mean that preferably 100% by weight of the monomers used are reacted but that it is also possible for a small residual monomer content of not more than up to about 0.5% by weight, based on the weight of the reaction mixture, to remain unreacted.

Suitable reactors for the copolymerization include the customary and known stirred tanks, stirred tank cascades, tube reactors, loop reactors or Taylor reactors, as described for example in the patent DE 1 071 241 B1, in the patent applications EP 0 498 583 A1 and DE 198 28 742 A1, or in the article by K. Kataoka in Chemical Engineering Science, Volume 50, Number 9, 1995, pages 1409 to 1416.

With regard to the molecular weight distribution, the (meth)acrylate copolymer (A) is not subject to any restrictions whatsoever. Advantageously, however, the copolymerization is carried out so as to give a molecular weight distribution Mw/Mn, measured by means of gel permeation chromatography using polystyrene as standard, of $\leq 4$, preferably $\leq 2$, and in particular $\leq 1.5$, and also, in certain cases, $\leq 1.3$.

The amount of the above-described binders (A) in the novel dual-cure powder slurries may vary widely and depends on the requirements of the case in hand. A key factor here is the functionality of the binder (AY with regard to thermal crosslinking, i.e., the number of isocyanate-reactive groups present in the binder mixture (A). The skilled worker will therefore be able to determine the amount with ease on the basis of his or her general knowledge in the art with the aid if desired of simple range finding experiments. The amount, based on the solids of the novel dual-cure powder slurry, is preferably from 10 to 80, more preferably from 15 to 75, with particular preference from 20 to 70, with very particular preference from 25 to 65, and in particular from 30 to 60% by weight.

By "solids" is meant, here and below, the, sum of the above-described constituents (A) and also the below-described constituents (B) and (C) and also, where appropriate, (D), which following the application and curing of the novel dual-cure powder slurries construct the coatings, adhesive films or seals in question.

The novel dual-cure powder slurries further comprise at least one blocked and/or part-blocked, in particular at least one blocked, polyisocyanate (B). Here and below, part-blocked polyisocyanates (B) are polyisocyanates in which less than 100 mol % of the free isocyanate groups have been blocked with the blocking agents described below.

As blocked polyisocyanates (B) it is possible to employ all blocked polyisocyanates, as are described, for example, in the German patent applications DE 196 17 086 A1, DE 196 31 269 A1 or DE 199 14 896 A1, in the European patent applications EP 0 004 571 A1 or EP 0 582 051 A1, or in the American patent U.S. Pat. No. 4,444,954 A.

It is, however, preferred to use blocked and/or part-blocked, especially blocked polyisocyanates (B) whose molecule includes at least one soft, flexibilizing segment, which, as a constituent or building block of three-dimensional polymeric networks, lowers their glass transition temperature Tg.

The soft, flexibilizing segments are divalent organic radicals.

Examples of suitable soft, flexibilizing, divalent organic radicals are substituted or unsubstituted, preferably unsubstituted, linear or branched, preferably linear, alkanediyl radicals having from 4 to 30, preferably from 5 to 20 and in particular 6 carbon atoms, which within the carbon chain may also contain cyclic groups.

Examples of highly suitable linear alkanediyl radicals are tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, pentadecane-1,15-diyl, hexadecane-1,16-diyl, heptadecane-1,17-diyl, octadecane-1,18-diyl, nonadecane-1,19-diyl or eicosane-1,20-diyl, preferably tetramethylene, pentamethylene, hexamethylene, heptamethylene, octamethylene, nonane-1,9-diyl, and decane-1,10-diyl, especially hexamethylene.

Examples of highly suitable alkanediyl radicals which also contain cyclic groups in the carbon chain are 2-heptyl-1-pentylcyclohexane-3,4-bis(non-9-yl), cyclohexane-1,2-, -1,4- or -1,3-bis(methyl), cyclohexane-1,2-, -1,4- or -1,3-bis (eth-2-yl), cyclohexane-1,3-bis(prop-3-yl) or cyclohexane-1,2-, -1,4- or -1,3-bis(but-4-yl).

Further examples of suitable divalent organic radicals are divalent polyester radicals comprising repeating polyester units of the formula —(—CO—$(CHR^1)_m$—$CH_2$—O—)—. In this formula the index m is preferably from 4 to 6 and the substituent $R^1$ is hydrogen or an alkyl, cycloalkyl or alkoxy radical. No one substituent contains more than 12 carbon atoms.

Further examples of suitable divalent organic radicals are divalent linear polyether radicals, preferably, having a number average molecular weight of from 400 to 5000, in particular from 400 to 3000. Highly suitable polyether radicals have the general formula —(—O—$(CHR^2)_o$—)$_p$O—, where the substituent $R^2$ is hydrogen or a lower, unsubstituted or substituted alkyl radical, the index o is from 2 to 6, preferably from 3 to 4, and the index p is from 2 to 100, preferably from 5 to 50. Especially suitable examples are linear or branched polyether radicals derived from poly(oxyethylene) glycols poly(oxypropylene) glycols and poly(oxybutylene) glycols.

Also suitable, furthermore, are linear divalent siloxane radicals, as present, for example, in silicone rubbers; hydrogenated polybutadiene or polyisoprene radicals, random or alternating butadiene-isoprene copolymer radicals or butadiene-isoprene graft copolymer radicals, which may also contain styrene in copolymerized form, and also ethylene-propylene-diene radicals.

Suitable substituents include all organic functional groups that are substantially inert, i.e., which do not undergo reactions with constituents of the novel dual-cure powder slurries.

Examples of suitable inert organic radicals are alkyl groups, especially methyl groups, halogen atoms, nitro groups, nitrile groups or alkoxy groups.

Of the above-described divalent organic radicals, the alkanediyl radicals containing no cyclic groups in the carbon chain are of advantage and are therefore used with preference.

In the blocked or part-blocked polyisocyanates (B) it is possible for only one kind of the above-described soft, flexibilizing, divalent organic radicals to be present. However, it is also possible to use at least two different divalent organic radicals.

Examples of highly suitable polyisocyanates suitable for preparing the blocked or part-blocked polyisocyanates (B) are accylic aliphatic diisocyanates such as trimethylene diisocyanate, tetramethylene diisocyanate, pentamethylene diisocyanate, hexamethylene diisocyanate, heptamethylene diisocyanate, ethylethylene diisocyanate, trimethylhexane diisodyanate or acyclic aliphatic diisocyanates containing cyclic groups in their carbon chain, such as diisocyanates derived from dimer fatty acids, as sold under the commercial designation DDI 1410 by Henkel and described in the patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane. In the context of the present invention, owing to their two isocyanate groups attached exclusively to alkyl groups and despite their cyclic groups, the latter are included among the accylic aliphatic diisocyanates.

Of these acyclic aliphatic diisocyanates, particular advantage is possessed by those containing no cyclic groups in their carbon chain. Of these, in turn, hexamethylene diisocyanate is especially advantageous and is therefore used with very particular preference.

Further examples of suitable polyisocyanates suitable for preparing blocked polyisocyanates (B) are the oligomers of the aforementioned diisocyanates, especially of hexamethylene diisocyanate, that contain isocyanurate, urea, urethane, biuret, uretdione, iminooxadiazinedione, carbodiimide and/or allophanate groups. Examples of suitable preparation processes are known from the patents CA 2,163,591 A, U.S. Pat. No. 4,419,513 A, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1 and EP 0 531 820 A1 or are described in the German patent application DE 100 05 228.2, unpublished at the priority date of the present specification.

Also suitable are the highly viscous polyisocyanates as described in the German patent application DE 198 28 935 A1, or the polyisocyanate particles surface-deactivated by urea formation and/or blocking, as per the European patent applications EP 0 922 720 A1, EP 1 013 690 A1 and EP 1 029 879 A1.

Additionally suitable as polyisocyanates are the adducts, described in the German patent application DE 196 09 617 A1, of polyisocyanates with dioxanes, dioxolanes and oxazolidines which contain isocyanate-reactive functional groups and still contain free isocyanate groups.

Examples of suitable blocking agents for preparing the blocked and/or part-blocked polyisocyanates (B) are the known blocking agents from the U.S. patent U.S. Pat. No. 4,444,954 A or U.S. Pat. No. 5,972,189 A, such as i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

ii) lactams; such as ε-caprolactam, δ-valerolactam, γ-butyrolactam or β-propiolactam;

iii) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, methoxymethanol, 2-(hydroxyethoxy)phenol, 2-(hydroxypropoxy)phenol, glycolic acid, glycolic esters, lactic acid, lactic esters, methylourea, methylolmelamine, diacetone alcohol, ethylenechlorohydrin, ethyl bromohydrin, 1,3-dichloro-2-propanol, 1,4-cyclohexyldimethanol or acetocyanohydrin;

iv) mercaptans such as butyl mercaptan, hexyl mercaptan, t-butyl mercaptan, t-dodecyl mercaptan, 2-mercaptobenzothiazole, thiophenol, methyl thiophenol or ethylthiophenol;

v) acid amides such as acetoanilide, acetoanisidinamide, acrylamide, methacrylamide, acetamide, stearamide or benzamide;

vi) imides such as succinimide, phthalimide or maleimide;

vii) amines such as diphenylamine, phenylnaphthylamine, xylidine, N-phenylxylidine, carbazole, aniline, naphthylamine, butylamine, dibutylamine or butylphenylamine;

viii) imidazoles such as imidazole or 2-ethylimidazole;

ix) ureas such as urea, thiourea, ethyleneurea, ethylenethiourea or 1,3-diphenylurea;

x) carbamates such as phenyl N-phenylcarbamate or 2-oxazolidone;

xi) imines such as ethyleneimine;

xii) oximes such as acetone oxime, formaldoxime, acetaldoxime, acetoxime, methyl ethyl ketokime, diisobutyl ketoxime, diacetyl monoxime, benzophenone oxime or chlorohexanone oximes;

xiii) salts of sulfurous acids such as sodium bisulfite or potassium bisulfite;

xiv) hydroxamic esters such as benzyl methacrylohydroxamate (BMH) or allyl methacrylohydroxamate; or xv) substituted pyrazoles, ketoximes, imidazoles or triazoles; and also xvi) mixtures of these blocking agents, especially dimethylpyrazole and triazoles, dimethylpyrazole and succinimide, or butyl diglycol and trimethylolpropane.

The amount of blocked and/or part-blocked polyisocyanates (B) in the novel dual-cure powder slurries may vary widely and is guided in particular by the functionality of the binder mixtures in respect of thermal curing, i.e., the number of isocyanate-reactive functional groups they contain. The skilled worker is therefore able in each individual case to determine the optimum amount with ease on the basis of his or her general knowledge in the art, with the aid if desired of simple preliminary experiments. Preferably, the amount of blocked polyisocyanates (B), based in each case on the solids of the dual-cure mixture of the invention, is from 10 to 70, more preferably from 12 to 65, with particular preference from 26 to 60, with very particular preference from 18 to 55, and in particular from 20 to 50% by weight.

Additionally, the novel dual-cure powder slurries comprise at least one olefinically unsaturated constituent (C).

Except for any technically occasioned traces that may be present, the olefinically unsaturated constituent (C) is free of isocyanate-reactive functional groups. It contains on average per molecule more than four, preferably at least five, and in particular six carbon-carbon double bonds activatable with actinic radiation.

The olefinically unsaturated constituent (C) may contain isocyanate groups and/or blocked isocyanate groups. Examples of suitable blocking agents are those described above.

Following their activation with actinic radiation, the carbon-carbon double bonds bring about the dimerization, oligomerization or polymerization of the olefinically unsaturated groups in question.

Highly suitable carbon-carbon double bonds are present, for example, in (meth)acryloyl, ethacryloyl, crotonate, cinnamate, vinyl ether, vinyl ester, ethenylarylene, dicyclopentadienyl, norbornenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups; ethenylarylene ester, dicyclopentadienyl ester, norbornenyl ester, isoprenyl ester, isopropenyl ester, allyl ester or butenyl ester groups. Of these, (meth)acryloyl groups, especially acryloyl groups, are of particular advantage, and so are used with very particular preference in accordance with the invention.

Accordingly, the olefinically unsaturated constituents (C) used with preference in accordance with the invention comprise (meth)acrylates.

Examples of suitable (meth)acrylates (C) are (meth)acryloyl-functional (meth)acrylic copolymers, polyether acrylates, polyester acrylates, unsaturated polyesters, epoxy acrylates, urethane acrylates, amino acrylates, melamine acrylates, silicone acrylates and the corresponding methacrylates. Of these, the urethane (meth)acrylates (C) are advantageous and are therefore used with particular preference.

The urethane (meth)acrylates (C), containing isocyanate groups and used with particular preference, are known, for example, from the European patent application EP 0 928 800 A1, page 3 lines 18 to 51 and page 4 lines 41 to 55. They may also be prepared by reacting the above-described polyisocyanates with the above-described hydroxyl-containing olefinically unsaturated monomers (a1). In this case, the molar ratio of polyisocyanates to monomers (a1) that is employed is such that the resulting urethane (meth)acrylates (C) still contain free isocyanate groups.

The urethane (meth)acrylates (C) containing blocked isocyanate groups and used with particular preference are preparable by reacting the above-described urethane (meth) acrylates (C) containing isocyanate groups with the above-described blocking agents. They are also described in the German patent application DE 100 41 635.7, unpublished at the priority date of the present specification. They may also still contain free isocyanate groups.

Preferably, the above-described urethane (meth)acrylates (C) used with particular preference are employed together with the (meth)acrylate copolymers (A1) and (A2).

Very particular preference is given to using olefinically unsaturated constituents (C) which contain no isocyanate groups and/or blocked isocyanate groups.

Preferably, the olefinically unsaturated constituent (C), particularly the urethane (meth)acrylates (C), especially the especially preferred urethane (meth)acrylates (C), includes at least one hardening segment as a molecule-building block. The hardening segment, as a constituent of three-dimensional polymeric networks, raises their glass transition temperature Tg.

The hardening segments are divalent or higher multivalent organic radicals. It is preferred to use divalent organic radicals. Alongside these in minor amounts it is possible to use multivalent, especially trivalent, organic radicals, by means of which it is possible to influence the crosslinking density.

Examples of highly suitable hardening segments are divalent aromatic, cycloaliphatic and aromatic-cycloaliphatic radicals, in the case of which within the olefinically unsaturated constituent (C), especially the urethane (meth)acrylate (C) used with very particular preference, at least one linking bond leads directly to the cycloaliphatic and/or aromatic structural unit. Preferably, both linking bonds lead to these structural units.

The divalent cycloaliphatic and aromatic radicals, especially the cycloaliphatic radicals, are advantageous and are used with preference.

Examples of suitable divalent aromatic radicals are substituted, especially methyl-substituted, or unsubstituted aromatic radicals having from 6 to 30 carbon atoms in the molecule, such as phen-1,4-, -1,3- or -1,2-ylene, naphth-1, 4-, -1,3-, -1,2-, -1,5- or -2,5-ylene, propane-2,2-di(phen-4'-yl), methanedi(phen-4'-yl), diphenyl-4,4'-diyl or 2,4- or 2,6-tolylene.

Examples of suitable divalent cycloaliphatic radicals are substituted or unsubstituted, preferably unsubstituted, cycloalkanediyl radicals having from 4 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4"-diyl, especially 3,3,5-trimethylcyclohexane-1,5-diyl or dicyclohexylmethane-4,4'-diyl. Besides these, it is possible in minor amounts to employ the corresponding triyl radicals.

Examples of suitable substituents are those described above.

In principle, the urethane (meth)acrylates (C) used with very particular preference are preparable by reacting a diisocyanate or polyisocyanate with a chain extender from the group of the diols/polyols and/or diamines/polyamines and/or dithiols/polythiols and/or alkanolamines, and then reacting the remaining free isocyanate groups with at least one compound containing at least one, especially one, of the above-described isocyanate-reactive groups, especially hydroxyl groups, and also at least one, especially one, carbon-carbon double bond.

Highly suitable double bonds are present in the olefinically unsaturated groups described above. Of these, (meth) acryloyl groups, especially acryloyl groups, are of particular advantage, and so are used with very particular preference in accordance with the invention.

Highly suitable compounds for introducing carbon-carbon double bonds are the monomers (a1) and (a2) described above, especially acrylic acid and methacrylic acid.

The hardening segments may be introduced both by way of the diisocyanates or polyisocyanates and also by way of the chain extenders.

Highly suitable diisocyanates and polyisocyanates are aromatic and cycloaliphatic, especially cycloaliphatic, diisocyanates and polyisocyanates. Diisocyanates and polyisocyanates considered aromatic and cycloaliphatic are those in which at least one isocyanate group is attached directly to an aromatic or cycloaliphatic structural unit.

Examples of suitable cycloaliphatic diisocyanates or polyisocyanates for introducing the hardening segments are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-

(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)-cyclohexane, 1-isocyanato-2(4-isocyanatobut-1-yl)-cyclohexane, 1,2-diisocyanatocyclobutane, 1,3-diisocyanatocyclobutane, 1,2-diisocyanatocyclopentane, 1,3-diisocyanatocyclopentane, 1,2-diisqcyanatocyclohexane, 1,3-diisocyanatocyclohexane, 1,4-diisocyanatocyclohexane, dicyclohexylmethane 2,4'-diisocyanate or dicyclohexylmethane 4,4'-diisocyanate, especially isophorone diisocyanate, and also the oligomers of these diisocyanates, especially of isophorone diisocyanate, that contain isocyanurate, urea, urethane, biuret, uretdione, iminooxadiazinedione, carbodiimide and/or allophanate groups.

Examples of suitable aromatic diisocyanates and polyisocyanates are 2,4- and 2,6-tolylene diisocyanate, 1,2-, 1,3- or 1,4-phenylene diisocyanate, naphthalene 1,4-, 1,3-, 1,2-, 1,5- or 2,5-diisocyanate, propane-2,2-di(phenyl 4'-diisocyanate), methanedi(phenyl 4'-isocyanates) or 1,1'-diphenyl-4,4'-diisocyanate.

Examples of suitable chain extenders for introducing hardening segments are cyclobutane-1,3-diol, cyclopentane-1,3-diol, cyclohexane-1,3- or 1,4-diol, cycloheptane-1,4-diol, norbornane-1,4-diol, adamantane-1,5-diol, decalindiol, 3,3,5-trimethylcyclohexane-1,5-diol, 1-methylcyclohexane-2,6-diol, dicyclohexylmethane-4,4'-diol, 1,1'-dicyclohexane-4,4'-diol or 1,4-dicyclohexylhexane-4,4"-diol, especially 3,3,5-trimethylcyclohexane-1,5-diol or dicyclohexylmethane-4,4'-diol.

Preferably, the hardening segments are incorporated into the urethane (meth)acrylates (C), especially into the urethane (meth)acrylates (C) used with very particular preference, by way of the diisocyanates and polyisocyanates.

Examples of suitable chain extenders which contain no hardening segments are described in the German patent application DE 199 14 896 A1, in the German patent application DE 44 21 823 A1, page 7 line 65 to page 8 lines 2 to 45, and page 10 lines 42 to 48, or in the European patent application EP 0 089 497, page 8 line 17 to page 9 line 1.

The amounts of chain extenders, di- and polyisocyanates and compounds containing on average at least one isocyanate-reactive group and at least one carbon-carbon double bond, especially hydroxyalkyl (meth)acrylates, are preferably chosen so that
1. the equivalents ratio of the NCO groups to the isocyanate-reactive groups of the chain extender is between 3:1 and 1:2, and is preferably 2:1, and
2. the isocyanate-reactive groups of the compounds containing on average per molecule at least one isocyanate-reactive group and at least one carbon-carbon double bond; especially hydroxyalkyl (meth)acrylates, are present in a stoichiometric amount in relation to the remaining free isocyanate groups of the prepolymer formed from isocyanate and chain extender.

A further possibility is to prepare the especially preferably used urethane (meth)acrylates (C) by first reacting some of the isocyanate groups of a di- or polyisocyanate with at least one compound containing at least one isocyanate-reactive group and at least one carbon-carbon double, bond in the molecule, especially a hydroxyalkyl (meth)acrylate, and then reacting the remaining isocyanate groups with a chain extender. In this case too, the amounts of chain extender, isocyanate and compound are chosen so that the equivalents ratio of the NCO groups to the isocyanate-reactive groups of the chain extender is between 3:1 and 1:2, and is preferably 2:1, and the equivalents ratio of the remaining NCO groups to the isocyanate-reactive groups of the compound is 1:1. Of course, all forms lying between these two processes are also possible. For example, some of the isocyanate groups of a diisocyanate may first be reacted with a diol as chain extender, after which a further portion of the isocyanate groups may be reacted with the compound, especially the hydroxyalkyl (meth)acrylate, and subsequently the remaining isocyanate groups may be reacted with a diamine as chain extender.

These various preparation processes for the urethane (meth)acrylates (C) used with very particular preference are known, for example, from the European patent application EP 0 204 161 A1.

The especially preferably used urethane (meth)acrylates (C) are commercially customary compounds and are sold, for example, under the brand name Ebecryl® 1290 by UCB, Belgium.

The amount of the olefinically unsaturated constituents (C), especially the urethane (meth) acrylates in the novel dual-cure powder slurries may vary widely and is guided by the requirements of the case in hand, in particular by the crosslinking density to be established in the seals, adhesive films and coatings of the invention that are produced from the novel dual-cure powder slurries. The amount, based in each case on the solids of the novel dual-cure powder slurry, is preferably from 5 to 50, more preferably from 8 to 45, with particular preference from 10 to 40, with very particular preference from 12 to 35, and in particular from 14 to 30% by weight.

The novel dual-cure powder slurries may further comprise at least one additive (D).

For instance, the novel dual-cure powder slurries may be pigmented and/or filled and/or dyed.

In a first preferred embodiment, the particles of the novel pigmented dual-cure powder slurries comprise at least one pigment and/or at least one filler (D); i.e., the entirety of the pigments and/or fillers (D) used is present in the particles.

In a second preferred embodiment, the novel pigmented dual-cure powder slurries comprise pigment-free particles and at least one pulverulent pigment (D) and/or at least one pulverulent filler (D); i.e., all of the pigments are present in the form of a separate solid phase. For their particle size, the comments made above apply analogously.

In a third preferred embodiment, the novel pigmented dual-cure powder slurries comprise particles which contain one portion of the pigments and/or fillers (D) used, while the other portion of the pigments and/or fillers (D) is present in the form of a separate solid phase. In this case, the fraction present in the particles may comprise the majority, i.e., more than 50%, of the pigments and/or fillers (D) used. However, it is also possible for less than 50% to be present in the particles. Regarding the particle sizes, the comments made above apply analogously here as well.

The choice of which variant of the novel pigmented dual-cure powder slurries is given preference is guided in particular by the nature of the pigments and/or fillers (D) and also by the process by which the novel pigmented dual-cure powder slurry in question is prepared in the majority of cases, the first preferred embodiment offers particular advantages, and so it is particularly preferred.

Suitable pigments (D) are color and/or effect pigments, electrically conductive pigments, magnetically shielding pigments and/or fluorescent pigments or metal powders. The pigments (D) may be organic or inorganic in nature.

Examples of suitable effect pigments (D) are metal flake pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, platelet-shaped effect pigments based on iron oxide with a shade from pink to brownish red, or liquid-crystalline effect pigments, for example. For further details, attention is drawn to Römpp Lexikon Lacke und Druckfarben, Georg Thieme Verlag, 1998, page 176, "Effect pigments", and pages 380 and 381, "Metal oxide-mica pigments" to "Metal pigments", and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A and U.S. Pat. No. 5,244,649 A.

Examples of suitable inorganic color pigments (D) are white pigments such as titanium dioxide, zinc white, zinc sulfide or lithophones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet or manganese violet, red iron, oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments (D) are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, attention is drawn to Römpp Lexikon Lacke und Druckfarben, Georg Thieme Verlag, 1998, pages 180 and 181, "Iron blue pigments" to "Black iron oxide", pages 451 to 453, "Pigments" to "Pigment volume concentration", page 563, "Thioindigo pigments", page 567, "Titanium dioxide pigments", pages 400 and 467, "Naturally occurring pigments", page 459, "Polycyclic pigments", page 52, "Azomethine pigments", "Azo pigments", and page 379, "Metal complex pigments".

Examples of fluorescent pigments (D) (daylight-fluorescent pigments) are bis(azomethine) pigments.

Examples of suitable electrically conductive pigments (D) are titanium dioxide/tin oxide pigments.

Examples of magnetically shielding pigments (D) are pigments based on iron oxides or chromium dioxide.

Examples of suitable metal powders (D) are powders of metals and metal alloys, such as aluminum, zinc, copper, bronze or brass.

Examples of suitable organic and inorganic fillers (D) are chalk, calcium sulfates, barium sulfate, silicates such as talc, mica or kaolin, silicas, oxides such as aluminum hydroxide, magnesium hydroxide or organic fillers such as polymer powders, especially those of polyamide or polyacrylonitrile. For further details, attention is drawn to Römpp Lexikon Lacke und Druckfarben, Georg Thieme Verlag, 1998, pages 250 ff., "Fillers".

It is of advantage to use mixtures of platelet-shaped inorganic fillers (D) such as talc, mica and non-platelet-shaped inorganic fillers such as chalk, dolomite, calcium sulfates, or barium sulfate, since by this means the viscosity and rheology may be adjusted very effectively.

Examples of suitable transparent fillers (D) are those based on silicon dioxide, aluminum oxide or zirconium oxide, but especially nanoparticles on this basis. These transparent fillers may also be present in the unpigmented coating materials of the invention, such as clearcoat materials.

The fraction of the pigments and/or fillers (D) in the novel pigmented dual-cure powder slurries for use in accordance with the invention may vary very widely and is guided by the requirements of the case in hand, in particular by the effect which is to be established and/or by the opacity of the pigments and/or fillers (D) used in each case. The amount is preferably from 0.5 to 80, more preferably from 0.8 to 75, with particular preference from 1.0, to 70, with very particular preference from 1.2 to 65, and in particular from 1.3 to 60% by weight, based in each case on the solids content of the novel dual-cure powder slurry.

In addition to the pigments and/or fillers (D), or instead of them, the novel dual-cure powder slurries may comprise molecularly dispersed dyes (D).

These molecularly dispersed dyes (D) may be present either in the particles or in the continuous phase of the novel dual-cure powder slurries.

Alternatively, they may be present in the particles and in the continuous phase. In this case, the fraction present in the particles may comprise the majority, i.e. more than 50%, of the organic dyes (D) that are used. It is also possible, however, for less than 50% to be present in the particles. The distribution of the organic dyes (D) between the phases may correspond to the thermodynamic equilibrium resulting from the solubility of the organic dyes (D) in the phases. The distribution may also, however, be far removed from the thermodynamic equilibrium.

Suitable dyes (D) are all organic dyes which are soluble, in the sense described above, in the novel dual-cure powder slurries. Lightfast organic dyes are very suitable. Especially suitable lightfast organic dyes (D) are those having little or no tendency to migrate from the coatings, adhesive films and seals produced from the novel dual-cure powder slurries. The migration tendency may be estimated by the skilled worker on the basis of his or her general knowledge in the art and/or with the aid of simple preliminary rangefinding tests, as part of tinting experiments, for example.

The amount of the molecularly dispersed organic dyes (D) in the novel dual-cure powder slurries may vary extremely widely and is guided primarily by the color and hue to be established, and also by the amount of any pigments and/or fillers (D) present.

Additives (D) which may be present both in the pigmented, filled and/or dyed novel dual-cure powder slurries and in the unpigmented, unfilled and/or undyed novel dual-cure powder slurries are additional crosslinking agents, such as amino resins, as described for example in Römpp Lexikon Lacke und Druckfarben, Georg Thieme Verlag, 1998, page 29, "Amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A or EP 0 245 700 A1, and also in the article by B. Singh and coworkers, "Carbamylinethylated Melamines, Novel Crosslinkers for the Coatings Industry", in Advanced Organic Coatings Science and Technology Series, 1991, Volume 13, pages 193 to 207; carboxyl-containing compounds or resins, as described for example in the patent DE 196 52 813 A1, compounds or resins containing epoxide groups, as described for example in the patents. EP 0 299 420 A1, DE 22 14 650 B1, DE 27 49 576 B1, U.S. Pat. No. 4,091,048 A or U.S. Pat. No. 3,781,379 A; blocked polyisocyanates other than the blocked polyisocyanates (B); and/or tris(alkoxycarbonylamino)triazines, as known from the patents U.S. Pat. No. 4,939,213 A, U.S. Pat. No. 5,084,541 A, U.S. Pat. No. 5,288,865 A or EP 0 604 922 A;

other radiation-curable constituents, different than the olefinically unsaturated constituents (C) such as (meth)acryloyl-functional (meth)acrylic copolymers, polyether acrylates, polyester acrylates, unsaturated polyesters, epoxy acrylates, various urethane acrylates, amino acrylates, melamine acrylates, silicone acrylates and the corresponding methacrylates;

additional customary and known binders other than the (meth)acrylate copolymers (A1) and (A2) for use in accordance with the invention, such as oligomeric and polymeric, thermally curable, linear and/or branched and/or block, comb and/or random poly(meth)acrylates or acrylic copolymers, especially those described in the patent DE 197 36 535 A1; polyesters; those described in the patents DE 40 09 858 A1 or DE 44 37 535 A1, alkyds, acrylated polyesters; polylactones; polycarbonates; polyethers; epoxy resin-amine adducts; (meth)acrylatediols; partially saponified polyvinyl esters; polyurethanes and acrylated polyurethanes, especially those described in the patent applications EP 0 521 928 A1, EP 0 522 420 A1, EP 0 522 419 A1, EP 0 730 613 A1 or DE 44 37 535 A1; or polyureas;

typical coatings additives, such as thermally curable reactive diluents (cf. the German patent applications DE 198 09 643 A1, DE 198 40 605 A1 or DE 198 05 421 A1) or reactive diluents curable with actinic radiation (cf. Römpp Lexikon Lacke und Druckfarben, Stuttgart, N.Y., 1998, page 491), low-boiling organic solvents and/or high-boiling organic solvents ("long solvents"), UV absorbers, light stabilizers, free-radical scavengers, thermolabile free-radical initiators, photoinitiators, crosslinking catalysts, devolatilizers, slip additives, polymerization inhibitors, defoamers, emulsifiers, wetting agents, adhesion promoters, leveling agents, film-formation auxiliaries, rheology control additives, such as ionic and/or nonionic thickeners; or flame retardants. Further examples of suitable coatings additives are described in the textbook "Lackadditive"by Johan Bieleman, Wiley-VCH, Weinheim, N.Y., 1998.

The novel dual-cure powder slurries preferably comprise nonionic and ionic thickeners (D), thereby effectively countering the tendency of the comparatively large solid and/or highly viscous particles to undergo sedimentation.

Examples of nonionic thickeners (D) are hydroxyethylcellulose and polyvinyl alcohols.

Thickeners known as nonionic associative thickeners (D) are likewise available commercially in a diverse selection. They generally consist of water-dilutable polyurethanes, the reaction products of water-soluble polyetherdiols, aliphatic diisocyanates and monofunctional hydroxy compounds with an organophilic radical.

Likewise commercially available are ionic thickeners (D). These normally include anionic groups and are based in particular on specific polyacrylate resins possessing acid groups, some or all of which may have been neutralized.

Examples of suitable thickeners (D) are known from the textbook "Lackadditive" by Johan Bieleman, Wiley-VCH, Weinheim, N.Y., 1998, pages 31 to 65, or from the German patent applications DE 199 08 018 A1, page 12 line 44 to page 14 line 65, DE 198 41 842 A1 or 198 35 296 A1.

For the novel dual-cure powder slurries it is advantageous that both of the above-described types of thickener (D) are present therein. The amount of the thickeners to be added and the ratio of ionic to nonionic thickener is guided by the desired viscosity of the slurry of the invention, which in turn is predetermined by the required sedimentation stability and by the specific needs of spray application. The skilled worker will therefore be able to determine the amount of the thickeners and the ratio of the types of thickener to one another on the basis of simple deliberations, with the assistance, if necessary, of preliminary tests.

Preference is given to a viscosity range from 50 to 1500 mPas at a shear rate of $1000$ $s^{-1}$ and from 150 to 8000 mPas at a shear rate of $10$ $s^{-1}$, and also from 180 to 12,000 mPas at a shear rate of $1$ $s^{-1}$.

This viscosity behavior, known as "pseudoplasticity", describes a state which does justice both to the requirements of spray application, on the one hand, and to the requirements in terms of storage stability and sedimentation stability, on the other: in the state of motion, such as when pumping the novel dual-cure powder slurries in circulation in the ring circuit of the paint shop and when spraying, for example, the novel dual-cure powder slurries adopt a state of low viscosity which ensures easy processability. Without shear stress, on the other hand, the viscosity rises and thus ensures that dual-cure coating materials, adhesives or sealing compounds present, following application, on the substrates to be coated, bonded and/or sealed have a reduced tendency to form runs on vertical surfaces. In the same way, a result of the higher viscosity in the stationary state, such as during storage, for instance, is that sedimentation of the solid and/or highly viscous particles is very largely prevented, or that any slight degree of settling of the novel dual-cure powder slurries during the storage period may be removed again by agitation.

For the usefulness of the above-described additives (D) it is important that the glass transition temperature Tg or the minimum film formation temperature (MFFT) (cf. Lexikon Lacke und Druckfarben, Georg Thieme Verlag, Stuttgart, N.Y., 1998, p. 391, "Minimum film formation temperature") of the particles of the novel dual-cure powder slurries is not lowered to such an extent by said additives (D) that the slurries coagulate.

The solids content of the novel dual-cure powder slurries may vary very widely. The content is preferably from 10 to 80, more preferably from 12 to 75, with particular preference from 14 to 70, with very particular preference from 16 to 65, and in particular from 18 to 60% by weight, based in each case on the novel dual-cure powder slurry.

The preparation of the novel dual-cure powder slurries from the above-described constituents has no special features in terms of its method but instead takes place substantially as described in detail in the patent applications DE 195 40 977 A1, DE 195 18 392 A1, DE 196 17 086 A1, DE-A-196 13 547, DE 196 18 657 A1, DE 196 52 813 A1, DE 196 17 086 A1, DE-A-198 14 471 A1, DE 198 41 842 A1 and DE 198 41 408 A1, except that in the context of the present invention pigments and/or fillers (D) may be processed as well.

In a first preferred variant of the preparation, the starting point is a pigmented powder coating material which is prepared as in the product information from BASF Lacke+ Farben AG, "Pulverlacke" [Powder coatings], 1990, or in the BASF Coatings AG brochure "Pulverlacke, Pulverlacke für industrielle Anwendungen" [Powder coatings, powder coating materials for industrial applications], January 2000, by homogenizing and dispersing, by means for example of an extruder or screw kneading apparatus, and grinding. Following the preparation of the powder coating materials, they are prepared for dispersion by further grinding and, if appropriate, by classifying and sieving.

The aqueous powder coating dispersion can then be prepared from the powder coating material by wet grinding or by stirred incorporation of dry-ground powder coating material. Particular preference is given to wet grinding. The novel dual-cure powder slurry is then filtered prior to its further processing.

It is of advantage in accordance with the invention to prepare the novel dual-cure powder slurries with the aid of the secondary dispersion process described in the German patent application DE 199 08 018 A1 on page 15 lines 37 to 65 or in the German patent application DE 199 08 013 A1 in column 4 lines 22 to 40 and column 12 line 38 to column 13 line 23.

The particles of the dual-cure powder slurries may also be mechanically comminuted in the wet state, which is referred to as wet grinding. In this case it is preferred to employ conditions such that the temperature of the material being ground does not exceed 70° C., preferably 60° C., and in particular 50° C. Preferably, the specific energy input during the grinding process is from 10 to 1000, more preferably from 15 to 750, and in particular from 20 to 500 Wh/g.

For wet grinding it is possible to employ a very wide variety of equipment which produces high or low shear fields.

Examples of suitable equipment which produces low shear fields are customary and known stirred tanks, slot homogenizers, microfluidizers or dissolvers.

Examples of suitable equipment which produces high shear fields are customary and known stirred mills or inline dissolvers.

Particular preference is given to employing the equipment which produces high shear fields. Among such equipment, the stirred mills are particularly advantageous in accordance with the invention and are therefore used with very particular preference.

During wet grinding, generally, the novel dual-cure powder slurry is supplied to the above-described equipment, and circulated therein, by means of appropriate devices, such as pumps, until the desired particle size is reached.

For energy reasons it is particularly advantageous if the novel dual-cure powder slurry to be ground contains only a portion, preferably from 5 to 90, more preferably from 10 to 80 and in particular from 20 to 70% by weight, of the above-described thickeners (D) that are to be introduced into it. Where this variant of the preferred process is employed, the remaining amount of thickener (D) is to be added after wet grinding.

Preferably, the novel dual-cure powder slurries are prepared in the absence of actinic radiation, in order to prevent premature crosslinking of, or other damage to, the novel dual-cure powder slurries.

The novel dual-cure powder slurries are outstandingly suitable as, or to prepare, dual-cure coating materials, adhesives and sealing compounds.

The novel dual-cure coating materials are outstandingly suitable for the production of single-coat or multicoat, color and/or effect, electrically conductive, magnetically shielding or fluorescent coatings, such as primer-surfacer coats, basecoats, solid-color topcoats or combination effect coats, or of single-coat or multicoat clearcoats.

The dual-cure adhesives of the invention are outstandingly suitable for producing adhesive films, and the dual-cure sealing compounds of the invention are outstandingly suitable for producing seals.

Very particular advantages result when the novel dual-cure coating materials are used as clearcoat materials for producing single-coat or multicoat clearcoats. In particular, the novel dual-cure clearcoat materials are used to produce multicoat color and/or effect coating systems by the wet-on-wet technique, in which a basecoat material, especially an aqueous basecoat material, is applied to the surface of the substrate, after which the resulting basecoat film is dried, without-being cured, and is overcoated with a clearcoat film. Subsequently, the two films are cured together.

In terms of method, the application of the novel dual-cure coating materials, adhesives and sealing compounds has no special features, but may instead take place by any customary application method, such as spraying, knifecoating, brushing, flow coating, dipping, trickling or rolling, for example. In the case of the dual-cure coating materials of the invention it is preferred to employ spray application methods, such as compressed air spraying, airless spraying, high-speed rotation, electrostatic spray application (ESTA), alone or in conjunction with hot spray applications such as hot air spraying, for example. Preferably, application takes place in the absence of daylight, in order to prevent premature crosslinking of the novel dual-cure powder slurries.

Suitable substrates are all those whose surface is undamaged by the conjoint use of actinic radiation and heat for curing the dual-cure films present thereon. The substrates preferably consist of metals, plastics, wood, ceramic, stone, textile, fiber composites, leather, glass, glass fibers, glass wool and rockwool, mineral-bound and resin-bound building materials, such as plasterboard and cement slabs or roof tiles, and composites of these materials.

Accordingly, the novel dual-cure coating materials, adhesives and sealing compounds are not only outstandingly suitable for applications in the fields of automotive OEM finishing and automotive refinish, but are also suitable for the coating, bonding and sealing of buildings, inside and out, and of doors, windows and furniture, for industrial coating, including coil coating, container coating and the impregnation and/or coating of electrical components, and also for the coating of white goods, including domestic appliances, boilers and radiators. In the context of industrial coatings, they are suitable for coating, bonding or sealing of virtually all parts and articles for private or industrial use, such as domestic appliances, small metal parts such as nuts and bolts, hubcaps, wheel rims, packaging, or electrical components, such as motor windings or transformer windings (electrical wound goods).

In the case of electrically conductive substrates, it is possible to use primers which are prepared in a customary and known manner from electrodeposition coating materials. Both anodic and cathodic electrodeposition coating materials are suitable for this purpose, but especially cathodic electrodeposition coating materials. Nonfunctionalized and/or nonpolar plastics surfaces may be subjected prior to coating in a known manner to a pretreatment, such as with a plasma or by flaming, or provided with a water-based primer.

The thermal curing of the applied dual-cure mixtures of the invention also has no special features in terms of its method but instead takes place in accordance with the customary and known thermal methods, such as heating in a forced air oven or irradiation using IR lamps.

Suitable radiation sources for curing with actinic radiation are sources such as high or low pressure mercury vapor lamps, with or without lead doping in order to open up a radiation window of up to 405 nm, or electron beam sources. Further examples of suitable processes and equipment for curing with actinic radiation are described in the German patent application DE 198 18 735 A1, column 10 line 31 to column 12 line 22. Preference is given to the use of a continuous UV unit from IST.

The resulting coatings, especially the single-coat or multicoat color and/or effect coatings and clearcoats of the invention, are easy to produce and have outstanding optical properties and very high light stability, chemical resistance, water resistance and weathering stability. In particular, they are free from clouding and inhomogeneities. Moreover, they are hard, flexible and scratch resistant. They possess outstanding intercoat adhesion and good to very good adhesion to automotive refinishes and to automotive production-line repair finishes. As is known, in the case of automotive production-line repair finishing, the ready-painted bodies are coated once again with the OEM finishes.

The adhesive films connect a very wide variety of substrates to one another firmly and durably and have a high chemical and mechanical stability even at extreme temperatures and/or with extreme temperature fluctuations.

Similarly, the seals provide durable sealing of the substrates, and exhibit high mechanical and chemical stability even under extreme temperatures and/or temperature fluctuations, and even in conjunction with exposure to aggressive chemicals.

It is, however, a very important advantage of the novel dual-cure powder slurries and of the novel dual-cure coating materials, adhesives and sealing compounds that, even in the shadow zones of three-dimensional substrates of complex shape, such as vehicle bodies, radiators or electrical wound goods, and even without optimum, especially complete, exposure of the shadow zones to actinic radiation, they give coatings, adhesive films and seals whose profile of performance properties at least comes close to that of the coatings, adhesive films and seals outside the shadow zones. As a result, the coatings, adhesives and seals present in the shadow zones are also no longer readily damaged by mechanical and/or chemical exposure.

Accordingly, the primed or unprimed substrates commonly employed in the technological fields recited above and coated with at least one novel coating, bonded with at least one novel adhesive film and/or sealed with at least one novel coating combine a particularly advantageous profile of performance properties with a particularly long service life, which makes them particularly attractive economically.

EXAMPLES

Preparation Example 1

The Preparation of a Methacrylate Copolymer (A1)

A suitable laboratory reactor equipped with stirrer, reflux condenser, thermometer, nitrogen inlet pipe and two feed vessels was charged with 895 parts by weight of methyl ethyl ketone and this initial charge was heated to 80° C. Subsequently, from the first feed vessel, a monomer mixture of 424 parts by weight of ethylhexy acrylate, 95 parts by weight of styrene, 257 parts by weight of hydroxyethyl methacrylate and 143 parts by weight of 4-hydroxybutyl acrylate and 34 parts by weight of acrylic acid was metered in over the course of four hours, and from the second feed vessel a solution of 95 parts by weight of tert-butyl peroxyethylhexanoate and 57 parts by weight of methyl ethyl ketone was metered in over the course of four and a half hours, both feeds taking place at a uniform rate and with stirring. The feeds were commenced simultaneously. After the end of the second feed (initiator feed), the reaction mixture was polymerized at 80° C. for two hours more. This gave a solution of the methacrylate copolymer (A1) having a solids content of 52% by weight (one hour/130° C.) with an acid number of 24.3 mg KOH/g solids and a hydroxyl number of 175 mg KOH/g solids. The methacrylate copolymer (A1) had a glass transition temperature, Tg, of −22° C.

Preparation Example 2

The Preparation of a Methacrylate Copolymer (A2)

Preparation example 1 was repeated except that 889 parts by weight of methyl ethyl ketone were used as the initial charge and the initiator feed added was a solution of 66 parts by weight of tert-butyl peroxyethylhexanoate and 87 parts by weight of methyl ethyl ketone, and was added over 6.5 hours, and the monomer feed used was a monomer mixture of 146 parts by weight of styrene, 459 parts by weight of tert-butyl acrylate, 219 parts by weight of n-butyl methacrylate, 583 parts by weight of hydroxypropyl methacrylate and 51 parts by weight of acrylic acid. This gave a solution of the methacrylate copolymer (A2) having a solids content of 58.6% by weight (one hour/130° C.) with an acid number of 27.5 mg KOH/g solids and a hydroxyl number of 156 mg KOH/g solids. The methacrylate copolymer (A2) had a glass transition temperature, Tg, of +65° C.

Preparation Example 3

The Preparation of a Blocked Polyisocyanate (B)

A suitable laboratory reactor equipped with stirrer, reflux condenser, thermometer and nitrogen inlet pipe was charged with 1068 parts by weight of an isocyanurate-type trimer of hexamethylene diisocyanate (Desmodur® N 3300 from Bayer AG) and 380 parts by weight of methyl ethyl ketone and this initial charge was slowly heated to 40° C. Thereafter, a total of 532 parts by weight of 3,5-dimethylpyrazole were added in portions in such a way that the temperature of the reaction mixture did not rise higher than 80° C. The reaction mixture was held at 80° C. until free isocyanate was no longer detectable, and then cooled. The resulting solution of the blocked polyisocyanate (B) had a solids content of 80% by weight.

Example 1

The Preparation of the Novel Dual-cure Powder Slurry

A suitable glass stirred vessel equipped with a high-speed stirrer was charged with 395 parts by weight of the solution of the methacrylate copolymer (A2) from preparation example 2, 490 parts by weight of the solution of the methacrylate copolymer (A1) from preparation example 1, 449 parts by weight of the solution of the blocked polyisocyanate (B) from preparation example 3, 236 parts by weight of an aliphatic urethane acrylate based on isophorone diisocyanate and containing 6 acrylate groups in the molecule (Ebecryl® 1290 from UCB, Belgium) and 22 parts by weight of dimethylethanolamine, and these components were mixed intensively with one another. To the resulting mixture there were added 9.4 parts by weight of a photoinitiator mixture consisting of Irgacure® 184 and Irgacure® 819 in a weight ratio of 7:1, 11.1 parts by weight of a commercially customary UV absorber and 11.1 parts by weight of a commercially customary reversible free-radical scavenger (HALS), and these components were likewise thoroughly mixed.

To this organic phase there were added, slowly and with stirring, 1775 parts by weight of water. The methyl ethyl ketone was subsequently removed by vacuum distillation at not more than 35° C.

The novel dual-cure powder slurry was completed by adding 1.5 parts by weight of a commercially customary leveling agent and also 8.8 parts by weight of Optiflo® L100, 26.4 parts by weight of Optiflo® M 200 and 8.8 parts by weight of Optiflo® M 210 (commercial thickeners from Süd Chemie).

The novel dual-cure powder slurry was storage-stable and easy to apply.

Example 2

The Production of a Multicoat Color Coating System Using the Novel Dual-cure Powder Slurry The novel dual-cure powder slurry of example 1 was applied pneumatically using a gravity-feed gun to steel panels which had been precoated with a black aqueous basecoat material. The wet film thickness of the applied films was from 30 to 40 μm. Following a flashoff time of 5 minutes at 23° C., the applied films were cured both under dual-cure conditions and under purely thermal conditions in order to simulate the curing in the shadow zones of three-dimensional substrates of complex shape.

For the thermal curing, forced air ovens from Binder and from Heraeus were used. The temperatures reported refer to the circulating air.

The radiation curing was carried out using a continuous UV unit from IST. Irradiation was carried out under atmospheric air. The radiation dose was determined immediately prior to curing, using a commercially customary dosimeter, and, where necessary, was varied by altering the belt speed. The radiation source was a medium-pressure mercury vapor lamp.

In order to simulate the continuous dual-cure coating and curing process involved in the production of automobiles, the coated steel panels were transferred within a very short time (no more than ten seconds) from the forced air oven, which was regulated at a temperature of 120° C., to the continuous UV unit. The cooling of the coated steel panels that occurred under these conditions was measured using a contact thermometer. It was not more than 20° C.

For the dual cure, the following conditions were employed:
drying: 10 minutes at room temperature, 5 minutes at 60° C., 7 minutes at 120° C.; UV curing: dose 3 J/cm²; thermal curing: 30 minutes at 155° C.

For the purely thermal cure, the following conditions were employed:
drying: 10 minutes at room temperature, 5 minutes at 60° C., 7 minutes at 120° C.; curing: 30 minutes at 155° C.

The scratch resistance of the resulting multicoat systems was determined with the aid of the Amtec-Kistler test, which is known in the art. 1.5 g/l ultrafine quartz flour Sikron SH 200 were used. The parameter measured was the loss of gloss at 20° C. following cleaning with petroleum washing spirit.

The chemical resistance was determined by means of the gradient oven test, known in the art, in accordance with DaimlerChrysler PBODDC371. The temperatures recorded were those above which the applied chemicals left visible damage in the multicoat systems.

The results of the tests are given in the table.

The results in the table underline the fact that the novel dual-cure powder slurry gave coatings, even in the shadow zones (simulated by the purely thermal curing), whose scratch resistance and, chemical stability matched that of coatings outside the shadow zones.

TABLE

Scratch resistance and chemical resistance of the novel multicoat systems

| Curing method | Loss of gloss | Chemical resistance (° C.): | | | |
|---|---|---|---|---|---|
| | | Sulfuric acid | Pancreatin | Tree resin | Water |
| Dual cure | 23 | <50 | 54 | 44 | 67 |
| Thermal | 21 | <53 | 46 | 63 | 69 |

What is claimed is:

1. A powder slurry curable thermally and with actinic radiation comprising particles, which are dimensionally stable under storage and application conditions and are at least one of solid and highly viscous, comprising
    (A) a binder free of carbon-carbon double bonds activatable with actinic radiation, comprising at least one (meth)acrylate copolymer containing on average per molecule at least one isocyanate-reactive functional group and at least one ion-forming group,
    (B) at least one at least partially-blocked polyisocyanate, and
    (C) at least one olefinically unsaturated constituent that is free of isocyanate-reactive functional groups and contains on average per molecule more than four carbon-carbon double bonds activatable with actinic radiation.

2. The slurry of claim 1, wherein the binder has a glass transition temperature of from −40 to +80° C.

3. The slurry of claim 1, wherein the binder comprises
    (A1) at least one (meth)acrylate copolymer containing on average per molecule at least one isocyanate-reactive functional group and having a glass transition temperature Tg below room temperature, and
    (A2) at least one (meth)acrylate copolymer containing on average per molecule at least one isocyanate-reactive functional group and having a glass transilion temperature Tg above room temperature.

4. The slurry of claim 1, wherein the isocyanate-reactive groups are selected from the group consisting at hydroxyl groups, thiol groups, primary amino groups, secondary amino groups, and combinations thereof.

5. The slurry of claim 4, wherein the isocyanate-reactive groups are hydroxyl groups.

6. The slurry of claim 5, wherein the at least one (meth) acrylate copolymer has a hydroxyl number of from 50 to 300 mg KOH/g and an acid number of from 3 to 70 mg KOH/g.

7. The slurry of claim 1, wherein the at least one ion-forming group is an acid group.

8. The slurry of claim 1, wherein the carbon-carbon double bond is present in at least one of a (meth)acryloyl group, an ethacryloyl group, a crotonate group, a cinnamate group, a vinyl ether group, a vinyl ester group, en ethenylarylene group, a dicyclopentadienyl group, a norbornenyl group, en isoprenyl group, an isopropenyl group, an allyl group, a butenyl group, an ethenylarylene ether group, a dicyolopentadienyl ether group, a norbornenyl ether group, an isoprenyl ether group, an isopropenyl ether group, an allyl ether group, a butenyl ether group, an ethenylarylene ester group, a dicyclopentadienyl ester group, a norbornenyl ester group, an isoprenyl ester group, an isopropenyl ester group, an allyl ester group, and a butenyl ester group.

9. The slurry of claim 8, wherein the carbon-carbon double bonds are present in a (meth)acryloyl group.

10. The slurry of claim 9, wherein the at least one olefinically unsaturated constituent is selected from the consisting of (meth)acryloyl-functional (meth)acrylic copolymers, (meth)acryloyl-functional polyether acrylates, (meth)acryloyl-functional polyester acrylates, (meth)acryloyl-functional unsaturated polyesters, (meth)acryloyl-functional epoxy acrylates, (meth)acryloyl-functional urethane acrylates, (meth)acryloyl-functional amino acrylates, (meth)acryloyl-functional melamine acrylates, (meth)acryloyl-functional silicone acrylates, and the corresponding methacrylates.

11. The slurry of claim 10, wherein the at least one olefinically unsaturated constituent comprises a urethane (meth)acrylate.

12. The slurry of claim 1, wherein the at least one at least partially-blocked polyisocyanate comprises at least one soft, flexibilizing segment in the molecule, which, as a constituent of three-dimensional polymeric networks, lowers their glass transition temperature Tg.

13. The slurry of claim 10, wherein the soft, flexibilizing segment is selected from the group consisting of
 (i) alkanediyl radicals having from 4 to 20 carbon atoms that are unsubstituted or substituted and are linear or branched;
 (ii) divalent polyester radicals comprising repeating polyester units of the formula —CO—(CHR$^1$)$_m$—CH$_2$—O—)—. In which the index m is from 4 to 6 and the substituent R$^1$ is hydrogen or an alkyl, cycloalkyl or alkoxy radical, no one substituent containing more than 12 carbon atoms;
 (iii) divalent linear polyether radicals of the general formula —(—O—(CHR$^2$)$_o$—)$_p$O—, where to substituent R$^2$ is hydrogen or a lower, unsubstituted or substituted alkyl radical and the index o is from 2 to 6, and the index p is from 2 to 100;
 (iv) linear divalont siloxane radicals,
 (v) divalent hydrogenated polybutadiene radicals;
 (vi) divalent hydrogenated polyisoprene radicals;
 (vii) divalent radicals of random or alternating butadiene-isoprene copolymers;
 (viii) divalent radicals of butadiene-isoprene graft copolymers; and
 (ix) divalent radicals of ethylene-propylene-diene copolymers.

14. The slurry of claim 1, wherein the at least one olefinically unsaturated constituent comprises at least one hardening segment in the molecule, which, as a constituent of three-dimensional polymeric networks, raises their glass transition temperature Tg.

15. The slurry of claim 14, wherein the hardening segments are selected from the group consisting of aromatic radical and cycloaliphatic radicals that are at least divalent.

16. The slurry of claim 1, wherein the slurry is one of a coating material, an adhesive, or a sealing compound.

17. The slurry as claimed in claim 16, wherein the slurry is a coating material and the coating material is one of i) a clearcoat material; ii) a color and/or effect coating material for producing clearcoats; and iii) a coating material for an at least one coat coating system that is at least one of a color and/or effect coating, an electrically conductive coating, a magnetically shielding coating, a fluorescent coating, and a combination effect coating.

18. A process for preparing the powder slurry curable thermally and with actinic radiation of claim 1, by a secondary dispersion process, comprising
 (I) emulsifying an organic solution comprising the constituents (A), (B), and (C) and, optionally, a thickener (D), to give an emulsion of the oil-in-water type,
 (II) removing organic solvent that may be present, and
 (III) replacing at least a portion of the volume of solvent removed by water, to give the powder slurry.

19. The process of claim 18, wherein the powder slurry is wet-ground.

20. The process of claim 18 further comprising applying the slurry to a substrate as one of an automotive OEM finish, an automotive refinish, a building coating, a furniture coating, a window coating, a door coating, an industrial coating, a coil coating, a container coating, an impregnation of electrical components, an electrical component coating, a white goods coating, an appliance coating, a boiler coating, and a radiator coating.

* * * * *